(12) United States Patent
Sefcik

(10) Patent No.: US 6,669,596 B1
(45) Date of Patent: Dec. 30, 2003

(54) DUAL INPUT CLUTCH PLANETARY TRANSMISSION

(75) Inventor: Michael Colby Sefcik, Linden, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/200,235

(22) Filed: Jul. 22, 2002

(51) Int. Cl.⁷ .............................. F16H 3/62; F16H 3/44
(52) U.S. Cl. ..................... 475/278; 475/280; 475/325
(58) Field of Search ................................. 475/269, 277, 475/279, 280, 325

(56) References Cited

U.S. PATENT DOCUMENTS

| | | | | |
|---|---|---|---|---|
| 4,627,308 A | * | 12/1986 | Moroto et al. | 475/280 X |
| 4,638,688 A | * | 1/1987 | Hiraiwa | 475/285 |
| 5,030,187 A | * | 7/1991 | Asada | 475/278 |
| 5,057,063 A | * | 10/1991 | Asada et al. | 475/278 |
| 5,567,201 A | * | 10/1996 | Ross | 475/280 |
| 6,213,909 B1 | * | 4/2001 | Raghavan | 475/282 |
| 6,287,233 B1 | * | 9/2001 | Haka | 475/280 X |

FOREIGN PATENT DOCUMENTS

JP      402209661   *  8/1990   ................. 475/287

* cited by examiner

Primary Examiner—Roger Pang
(74) Attorney, Agent, or Firm—Leslie C. Hodges

(57) ABSTRACT

A dual input planetary transmission has at least two planetary gearsets, two input clutches, five synchronizer clutches, and two brake mechanisms. The planetary gearsets each have one member continuously interconnected with a transmission output shaft and at least one member selectively connectible with a transmission input shaft through the input clutches and at least of two of the synchronizer clutches. The synchronizer clutches also provide selective interconnections of members of one of the planetary gearsets with members of the other of the planetary gearsets. The input clutches are interchanged during a speed ratio interchange and at least one synchronizer clutch is manipulated to preselect the on-coming speed ratio. The input clutches, synchronizer clutches, and brake mechanisms are engaged in various combinations to establish at least six forward speed ratios and one reverse speed ratio.

4 Claims, 4 Drawing Sheets

| Gear | Ratio | Step Size | 30A | 28A | 30B | 28B | 34A | 34B | 38 | 32A | 32B | 26A | 18 | 20 |
|---|---|---|---|---|---|---|---|---|---|---|---|---|---|---|
| low 1st | 8.93 |  |  | X |  | X |  |  |  | X | X |  | X |  |
| 1st | 5.39 | 1.65 | X |  | X | X |  |  |  | O |  |  | X |  |
| 2nd | 3.13 | 1.73 |  | X |  | X |  |  |  | X |  |  |  | X |
| 3rd | 1.93 | 1.62 |  |  | X |  | X |  |  |  | O |  | X |  |
| 4th | 1.40 | 1.37 |  |  | O | X |  | X |  |  | X |  |  | X |
| 5th | 1.00 | 1.40 |  |  | X | X |  |  |  |  | X |  | X | X |
| 6th | 0.87 | 1.14 |  |  | O | X | X |  |  |  | X |  |  | X |
| 7th | 0.71 | 1.23 |  |  | X |  | X |  |  |  | O |  | X | X |
| 8th | 0.57 | 1.26 |  |  | O | X |  | X |  |  | X |  |  | X |
| Neut |  |  |  |  |  |  |  |  |  |  |  |  |  |  |
| Rev$_1$ | 6.12 |  | X | X |  |  |  |  | X |  | X |  | X |  |

Overall Ratio: 6 SPEED 6.20
Overall Ratio: 7 SPEED 7.59
Overall Ratio: 8 SPEED 9.46
Overall Ratio: 9 SPEED 15.67

X = Engaged
O = Engaged But Not Transmitting Torque $$\frac{R1(42)}{S1(40)} = 1.77, \quad \frac{R2(56)}{S2(52)} = 2.45, \quad \frac{R2(56)}{S3(54)} = 1.65$$

| Gear | Ratio | Step Size | 28A | 28A | 230B | 230A | 234B | 234A | 236 | 32B | 32A | 26A | 18 | 20 |
|---|---|---|---|---|---|---|---|---|---|---|---|---|---|---|
| low 1st | 8.93 | | | | | X | X | | | X | | X | | X |
| 1st | 5.39 | 1.65 | | | | X | X | | | O | | | X | |
| 2nd | 3.13 | 1.73 | | X | | | X | | | X | | | | X |
| 3rd | 1.93 | 1.62 | | | | X | X | | | | O | | X | |
| 4th | 1.40 | 1.37 | X | | O | | | X | | | X | | | X |
| 5th | 1.00 | 1.40 | X | | X | | | | | | X | | X | |
| 6th | 0.87 | 1.14 | X | | O | | | | X | | X | | | X |
| 7th | 0.71 | 1.23 | | X | X | | | X | | | O | | X | |
| 8th | 0.57 | 1.26 | X | | O | | | X | | | X | | | X |
| Neut | | | | | | | | | | | | | | |
| Rev$_1$ | 6.12 | | X | X | | | X | | | | | X | | X |

Overall Ratio: 6 SPEED 6.20
Overall Ratio: 7 SPEED 7.59
Overall Ratio: 8 SPEED 9.46
Overall Ratio: 9 SPEED 15.67

DUAL INPUT CLUTCH PLANETARY TRANSMISSION

TECHNICAL FIELD

This invention relates to multi-speed power transmissions and, more particularly, to multi-speed power transmissions having two input clutches.

BACKGROUND OF THE INVENTION

Dual input clutch transmissions are designed to permit engine power to be distributed through separate power paths depending upon which input clutch is engaged. During the engagement of one of the input clutches, and a power path which is completed by other clutches downstream in the power flow path, the second or oncoming power path can be preselected by moving or operating other clutches in the on-coming power path and then swapping the input clutches. This swapping procedure takes place through the forward speeds. For example, the first clutch is on in odd number ratios and the second clutch is on in even number ratios.

The dual clutch power transmissions have been primarily designed as countershaft-type transmissions. Countershaft-type transmissions are commonly termed manual transmissions in the transmission art. Each of these types of transmissions includes a synchronizer clutch or mechanical clutch for each of two gear ratios on each countershaft. The first of the input clutches connects the power path through a head gear set to a first countershaft and the second input clutch connects the head gear set to a second countershaft. The head gear set might be equal in ratio or different in ratio. The power paths then flow from their respective countershafts back to a main transmissions shaft, which is connected with the transmission output shaft. More recently, it has been considered to employ planetary gearsets in the power flow paths downstream of the dual input clutches.

SUMMARY OF THE INVENTION

It is an object of present invention to provide an improved dual input clutch power transmission employing planetary gearsets.

In one aspect of the present invention, the transmission includes a compound planetary gearset and a Ravigneaux planetary gearset.

In another aspect of the present invention, the Ravigneaux-type gearset is comprised of a simple gearset and a compound gearset.

In still another aspect of the present invention, a plurality of synchronizers is disposed between the input clutches and the planetary gearsets.

In yet still another aspect of the present invention, a synchronizer clutch and brake mechanism are employed in series to provide reaction members in the second planetary gearset.

In a further aspect of the present invention, a second brake mechanism is included to establish another member of the second planetary gearset as a reaction member.

In a yet further aspect of the present invention, one member of the first planetary gearset and one member of the second planetary gearset are continuously interconnected and are also continuously interconnected with an output shaft of the transmission.

In a still further aspect of the present invention, a total of five mechanical or synchronizer clutches are employed, four of which provide two-way clutching operations and one of which employs a one-way clutching operation.

In a yet still further aspect of the present invention, two of the mechanical clutches are considered configuration clutches which are employed to provide interconnections between the planetary gearsets as opposed to applying an input to the planetary gearsets.

In yet a still further aspect of the present invention, two of the synchronizer clutches provide input power paths from the input clutches to the planetary gearsets.

In another aspect of the present invention, one of the input mechanical clutches selectively connects one of the input clutches with two members of the first planetary gearset individually.

In still another aspect of the present invention, the second of the input synchronizer clutches provides an input connection between the other input clutch and two members of the second planetary gearset.

In yet still another aspect of the present invention, the first or compound planetary gearset is a three-node planetary gearset and the second or Ravigneaux gearset is a four-node planetary gearset.

The input clutches and synchronizer clutches are engaged in a plurality of combinations to provide at least six forward speed ratios and one reverse speed ratio. The combinations of engagements also provide up to nine forward speed ratios and a reverse speed ratio. This permits the transmission to provide various overall ratio coverage depending upon the usage of the transmission. The ratio coverage provided in even the six speed transmission, permits direct connection between the engine and the input clutches without the intervention of a hydrodynamic drive, such as a torque converter, thereby improving the overall efficiency of the transmission. It is considered that those skilled in the transmission art will be aware of the many electro-hydraulic control systems that are available to control mechanisms, such as input friction clutches, friction brakes, and synchronizer manipulation mechanisms.

DESCRIPTION OF EXEMPLARY EMBODIMENTS

Figure 1:
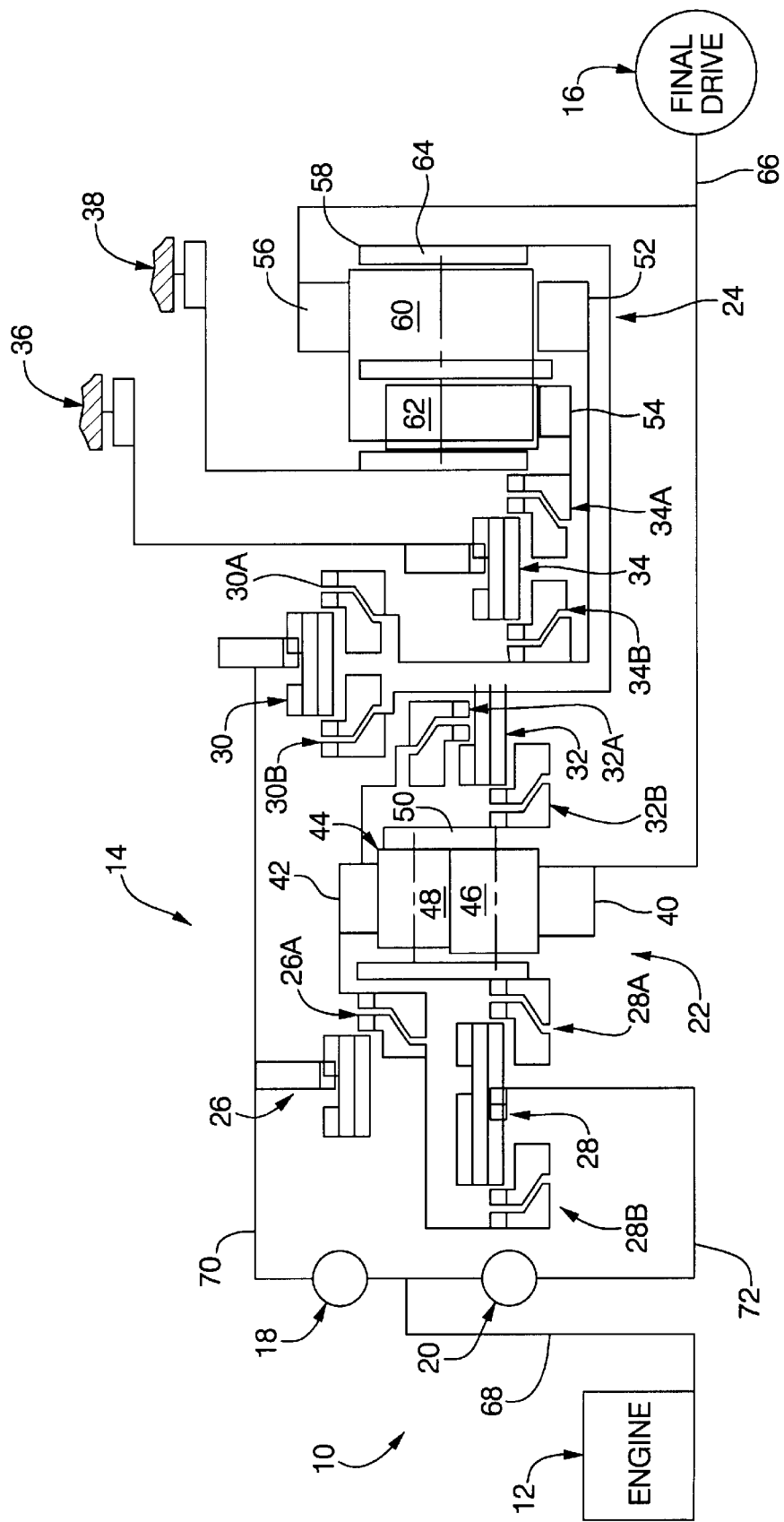
FIG. 1 is a schematic representation of a powertrain having a planetary transmission incorporating the present invention.

Referring to the drawings, wherein like characters represent the same or corresponding parts throughout the several views, there is seen in FIG. 1 a powertrain generally designated 10, which includes an engine 12, a planetary transmission 14, and a conventional final drive mechanism 16. The engine 12 is a conventional prime mover power source, such as an internal combustion engine or a diesel engine. The final drive mechanism 16 is a conventional differential mechanism, which supplies drive to at least two drive wheels for a vehicle.

The planetary transmission 14 includes two conventional input friction clutches 18 and 20, two planetary gearsets 22 and 24, five synchronizer clutches or mechanical clutches 26, 28, 30, 32, and 34, and two friction brakes 36 and 38. The input clutches 18 and 20 are conventional fluid-operated friction devices well known in the art. As is well known, these clutches can be engaged mechanically, hydraulically, or electrically, preferably they are engaged hydraulically through the use of a conventional electro-hydraulic control system, not shown.

The synchronizer clutches 28, 30, 32 and 34 are conventional mechanically engaged clutch mechanisms. Each of these are two-way synchronizer mechanisms. The synchronizer clutch 26 is a one-way synchronizer clutch mechanism. Each of the synchronizer clutches 26, 28, 30, 32, and 34 have a neutral position, during which no power or torque is transferred through the synchronizer clutches.

The friction brakes 36 and 38 are conventional fluid-operated friction-type brakes and may be either disc-type or band-type brakes. The brakes 36 and 38 may also be operated by conventional electro-hydraulic systems.

The synchronizer clutches 26, 28, 30, 32, and 34 can be operated mechanically, electrically, or hydraulically. If actuated hydraulically or electrically, a conventional fluid-operated electro-hydraulic system will be employed. A mechanical control system for the synchronizer clutches can also incorporate electrical or hydraulic actuators, which respond to the mechanical movement by the operator.

The synchronizer clutch 26 has an actuated position 26A and a neutral position. The synchronizer clutch 28 has an actuated position 28A, an actuated position 28B, and a neutral position. The synchronizer clutch 30 has an actuated position 30A, an actuated position 30B, and a neutral position. The synchronizer clutch 32 has an actuated position 32A, an actuated position 32B, and a neutral position. The synchronizer clutch 34 has an actuated position 34A, an actuated position 34B, and a neutral position. The synchronizer clutch 34 is continuously connected with the brake 36, such that in both 36A and 36B a braking operation can be formed or conducted through the synchronizer clutch 34.

The planetary gearset 22 is a compound planetary gearset having a sun gear member 40, a ring gear member 42, and a planet carrier assembly member 44. The planet carrier assembly member 44 has a plurality of intermeshing pinion gear members 46 and 48, which are rotatably mounted on a planet carrier member 50 and disposed in meshing relationship with the sun gear member 40 and the ring gear member 42, respectively.

The planetary gearset 24 is a Ravigneaux-type gearset including a first sun gear member 52, a second sun gear member 54, a ring gear member 56, and a planet carrier assembly member 58. The planet carrier assembly member 58 includes a plurality of long pinion gear members 60 and short pinion gear members 62 that are intermeshing and rotatably disposed on a planet carrier member 64. The long pinion gear member 60 meshes with the sun gear member 52 and the ring gear member 56.

The short pinion gear member 62 meshes with the sun gear member 54 and the long pinion gear member 60. As is well known, the Ravigneaux-type gearset is essentially a compound gearset and a simple gearset combined in a single planetary gearset. The sun gear member 52, ring gear member 56, and pinion gear 60 illustrate a simple planetary gearset; and the sun gear member 54, the pinion gear member 62, pinion gear member 60, and ring gear member 56 represent a compound planetary gearset. The planetary gearset 24 is designed, such that the ring gear member for both the simple and compound planetary gearsets has the same number of teeth and can therefore mesh with simply the long pinion gear member 60.

The sun gear member 40 and ring gear member 56 are continuously drivingly connected with a transmission output shaft 66, which is drivingly connected with the final drive mechanism 16. The input clutches 18 and 20 are continuously drivingly connected with the engine 12 through a power input shaft 68. The input clutch 18 is connected with a transmission input shaft 70, which is also connected with both the synchronizer clutch 26 and the synchronizer clutch 30. The input clutch 20 has a transmission input shaft 72, which is continuously connected with the synchronizer clutch 28. Thus, when the clutch 18 is engaged, the transmission input shaft 70 is connected with the engine 12 and when the clutch 20 is engaged, the input shaft 72 is connected with the engine 12.

The synchronizer clutch 26 in position 26A is continuously connected with the ring gear member 42. The synchronizer clutch 28 in position 28A is connected with the planet carrier member 50 and also position 32B of synchronizer clutch 32, and the synchronizer clutch 32 in position 32A is connected with the ring gear member 42. The synchronizer clutch 30 in the position 30A is connected with the sun gear member 52 and also with one side of the synchronizer clutch 34, the synchronizer clutch 32, in position 32A, is connected to carrier member 64 and, in the position 32B, is connected with carrier member 50. The synchronizer clutch 30 in position planet carrier member 64. The synchronizer clutch 34 in position 34A is connected with the sun gear member 54 and in the position 34B is connected with the sun gear member 52. As previously mentioned, each of the synchronizer clutches has a neutral position, and all of the clutches shown in FIG. 1 are shown in their neutral position.

The brake mechanism 36, when engaged, will hold the synchronizer clutch 34 stationary, and the brake mechanism 38, when engaged, will hold the planet carrier member 64 stationary.

Figures 2, 3:
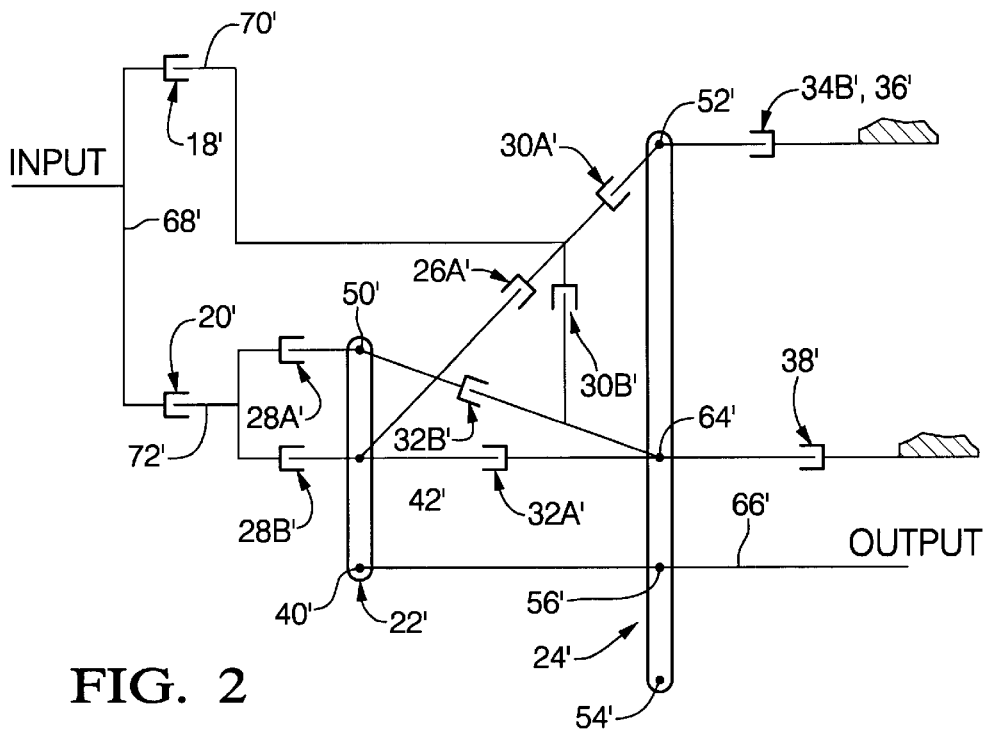
FIG. 2 is a lever diagram representation of the planetary transmission shown in FIG. 1.
FIG. 3 is a truth table of the clutch selection for the planetary transmission shown in FIG. 1.

The planetary gearset 22 has three nodes, as shown in the lever diagram of FIG. 2. The nodes represent the corresponding gear members with a prime designation being given to the numerical characteristic. The three nodes of the lever 22' are 40', 42' and 50' representing the sun gear member 40, ring gear member 42, and planet carrier member 50, respectively.

The planetary gearset 24 has four nodes represented in the lever diagram of FIG. 2 as 54', 56', 52', and 64'. Therefore the lever 24' of FIG. 2 represents the sun gear member 54, the ring gear member 56, the planet carrier member 64, and the sun gear member 52. The friction clutches, synchronizer clutches, and friction brakes have been given the same designations in the lever diagram of FIG. 2 with a prime designation. In other words, the clutch 18 of FIG. 1 is represented by 18' in FIG. 2. Each of the synchronizer clutches have both their A and B positions shown. The synchronizer clutch 26, of course, only has an operating position 26A, which is shown as 26A'. The synchronizer clutch 28 has positions 28A' and 28B' shown; the synchronizer clutch 32 has positions 32A' and 32B' shown; the synchronizer clutch 30 has positions 30A' and 30B' shown. The synchronizer clutch 34 has positions 34A' and 34B' shown. The synchronizer clutch positions 34A' and 34B' also have provided therewith the friction brake 36' indicator. The brake 38 is shown as 38' in FIG. 2.

The truth table of FIG. 3 provides a chart showing the actuated position of the synchronizer clutches, friction clutches, and friction brakes. Two of the synchronizer clutches 30 and 28 are considered input devices, the synchronizer clutch 34 is considered a reaction member, and the synchronizer clutches 32 and 26 are considered configuration clutches. The input clutches 28 and 30 are operable to provide an input power path or torque path from the engine 12 to the respective gear members. The reaction clutch 34 is operable to provide a ground member or a reaction member within the planetary transmission. The configuration clutches 32 and 26 are operable to provide interconnections between members of one planetary gearset with members of the other planetary gearset.

The configuration clutch 32 is operable in the position 32A to interconnect the ring gear member 42 with the planet carrier member 64. In the position 32B, the clutch 32 interconnects the planet carrier member 50 with the planet carrier member 64. The configuration clutch 26 acts in cooperation with the synchronizer clutch 30 to interconnect the ring gear member 42 and the sun gear member 52. The input synchronizer clutch 28 operates to connect the input shaft 72 with the ring gear member 42 and with the planet carrier member 50 selectively. The input synchronizer clutch 30 is operative to connect the input shaft 70 with the sun gear member 52 (position 30A) and with the planet carrier member 64 (position 30B). These interconnections can be readily seen in the lever diagram of FIG. 2.

The truth table of FIG. 3 describes nine forward speed ratios and one reverse speed ratio. The nine forward speed ratios include a creeper ratio or low first gear. The transmission can be operated as an eight speed transmission, which are shown as ratios first through eighth; a seven speed transmission, which are shown as ratios first through seventh; or a six speed transmission, which are shown as ratios first through sixth.

The numerical values given in the truth table of FIG. 3 are determined using the ring gear/sun gear tooth ratios given in FIG. 3. R1/S1 is the ratio of the ring gear member 42 to the sun gear member 40; R2/S2 is the ratio of the ring gear member 56 to the sun gear member 52; and R3/S3 is the ratio of the ring gear 56 to the sun gear member 54.

As seen in the truth table, the low first gear is established with the engagement of the synchronizer clutch 30 in position 30A; the synchronizer clutch 34 in the position 34A; the synchronizer clutch 32 in the position 32A; the synchronizer clutch 26 in the position 26A; and the brake 36 is engaged. Power is then transmitted from the engine 12 to the output shaft 66 by engaging the input clutch 20.

To establish the first forward speed ratio, the synchronizer clutch is in the position 30A; the synchronizer clutch 34 is in the position 34A; and the input clutch 18 is engaged. During the first forward speed ratio, the synchronizer clutch 32 can be in the 32A position, however, no torque would be transmitted through the clutch at this time. While the transmission is in the first forward speed ratio, the synchronizer clutch 28 can be shifted to the 28A position in the preselected position for the second forward speed ratio. To complete the interchange to the second forward speed ratio, the input clutch 18 is disengaged while the input clutch 20 is engaged. This engagement interchange is generally made simultaneously therefore no torque interruption is felt at the transmission output shaft.

During the second forward speed ratio, the clutch 34A provides reaction at the sun gear member 54 and the clutch 32A acts as a configuration clutch to provide the interconnection between the ring gear member 42 and the planet carrier member 64. While the transmission is operating in the second forward speed ratio, the synchronizer clutch 30 can be manipulated to the position 30B without transmitting torque. To complete the interchange from second to third forward speed ratio, the clutch 20 is disengaged while the clutch 18 is simultaneously engaged.

When the transmission is operating in the third forward speed ratio, the clutch 32 can be moved from the 32A position to the 32B position without the transmission of torque and therefore the synchronizer interchange is simplified. Obviously, a downshift from second ratio to first ratio can be accomplished by simply reversing the first-to-second interchange manipulation.

The fourth forward speed ratio is preselected while operating in the third ratio by manipulating the synchronizer clutch 28 to the position 28B. The interchange is completed by swapping the input clutches 18 and 20 and moving synchronizer 34 from position 34A to position 34B. During the fourth forward speed ratio, the clutch 32B is acting as a configuration clutch and is transmitting torque during the fourth forward speed ratio. Also during the fourth forward speed ratio, the synchronizer clutch 30 can be moved to the neutral position, if desired, however this complicates the 4–5 shift because it requires the synchronizer to be repositioned back to position 32B before the shift to 5th can be completed. To preselect the fifth forward speed ratio while operating in the fourth forward speed ratio, the synchronizer clutch 30 is manipulated to the position 30B and to complete the fourth to fifth interchange, the input clutches 20 and 18 and brake 36 is de-energized. The synchronizer clutch 32 is operating in the position 32B and is a configuration clutch to provide the desired interconnection between the planetary gearsets.

The fifth forward speed ratio, as noted in the truth table, is a 1:1 ratio such that both clutches 18 and 20 can be simultaneously engaged without detriment to the torque paths within the transmission.

To provide a ratio interchange from fifth ratio to sixth, the synchronizer clutch 34 is preselected to the position 34B and the input clutch 18 is disengaged. To preselect the seventh forward speed ratio from the sixth forward speed ratio, the synchronizer clutch 30 is manipulated to the position 30B. The sixth-to-seventh interchange is completed by interchanging or swapping the input clutches 20 and 18. During the seventh forward speed ratio, the synchronizer clutch 32 can remain in the position 32B since there is no torque transmitted through this path during the seventh forward speed ratio.

The eighth forward speed ratio is preselected by manipulating the synchronizer clutch 28 to the position 28B. The seventh-to-eighth interchange is then completed by swapping the input clutches 18 and 20 and simultaneously engaging the brake 38 while disengaging the brake 36. During the eighth forward speed ratio, the clutch 32 in position 32B is a configuration clutch and is part of the torque path during the eighth forward speed ratio.

The reverse speed ratio is established by positioning the synchronizer clutch 30 in position 30A; the synchronizer clutch 28 in the position 28A; the synchronizer clutch 26 in position 26A and engaging the friction brake 38. The reverse speed ratio is then completed by engaging the input clutch 20.

Those skilled in the art will recognize that the first forward speed ratio, the third forward speed ratio, and the seventh forward speed ratio are accomplished through the planetary gearset 24 only. The fifth forward speed ratio is a direct drive ratio, and the remaining ratios are accomplished by both planetary gearsets 22 and 24.

A powertrain 210 is similar to the powertrain 10 in FIG. 1 in that it includes the engine 12, a planetary transmission 214, and the final drive mechanism 16. The planetary transmission 214 has two planetary gearsets 22 and 24, five synchronizer or mechanical clutches 26, 28, 232, 234, and 230, and two friction brakes 236 and 238.

The planetary gearset 22 includes the sun gear member 40, the ring gear member 42, and the planet carrier assembly member 44. The planet carrier assembly member 44 includes the pair of intermeshing planetary pinion gears 46 and 48, which are rotatably mounted on the planet carrier member 50 and disposed in meshing relationship with the sun gear member 40 and ring gear member 42, respectively.

The planetary gearset 24 includes the sun gear members 52 and 54, the ring gear member 56 and the planet carrier assembly member 58. The planet carrier assembly member 58 includes the long pinion 60 meshing with the sun gear member 52 and the ring gear member 56, and the short pinion gear member 62 meshing with the sun gear member 54 and the long pinion gear member 60. The pinion gear members 60 and 62 are rotatably mounted on the planet carrier member 64. The ring gear member 56 and the sun gear member 40 are continuously interconnected with the final drive mechanism 16. These planetary gearsets are identical with the planetary gearset found in FIG. 1.

The synchronizer clutch 26 is the same as the synchronizer clutch 26 of FIG. 1, such that the input clutch 18 is selectively interconnectable through the synchronizer clutch 26 (position 26A with the ring gear member 42 and with synchronized clutch 32 (position 32B). The synchronizer clutch 28 is the same as the synchronizer clutch 28 of FIG. 1 and is connectible between the input clutch 20 and the ring gear member 42 in the position 28A.

The synchronizer clutch 230 is similar to the synchronizer clutch 30 of FIG. 1, however, the synchronizer clutch 230 in position 230A is connectible between the friction brake 236 and the sun gear member 52 and in position 230B connectible between the input clutch 18 and the planet carrier member 64. The synchronizer clutch 32 provides the same connections as providing in FIG. 1 so that in position 32A the planet carrier 50 is interconnected with the planet carrier 64 and in position 32B the ring gear member 42 is interconnected with the planet carrier member 64.

The synchronizer clutch 234 is similar to the synchronizer clutch 34 in FIG. 1 with the exception that in position 234A the brake 238 is interconnected with the planet carrier 64 and in the position 234B the brake 238 is interconnected with the sun gear member 54.

Figures 5, 6:
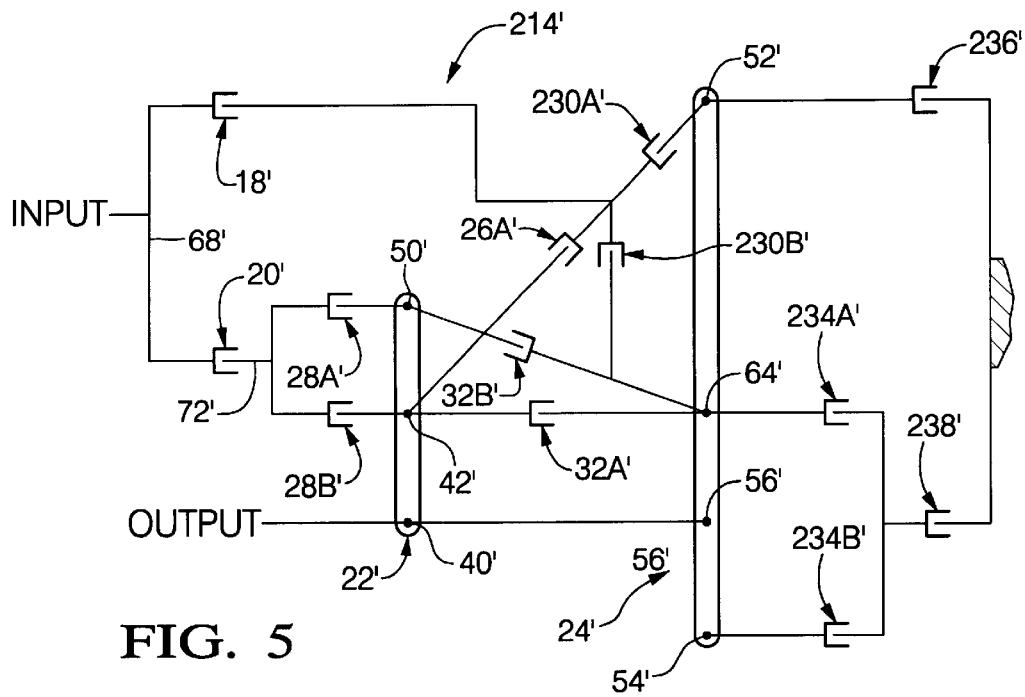
FIG. 5 is a lever diagram representation of the planetary transmission shown in FIG. 4.
FIG. 6 is a truth table of the clutch selection for the planetary transmission shown in FIG. 4.

The lever diagram of FIG. 5 shows the interconnection between the three nodes of the planetary gearset 22' and the four nodes of the planetary gearset 24 as well as 24'. The interconnection completed by the synchronizer clutches and the brake are shown in the lever diagram of FIG. 5. These synchronizers and brakes as well as input clutches 18 and 20 will provide the various lever formations that are representative of the planetary transmission 214.

From the truth table of FIG. 6 it will be evident to those skilled in the art that the synchronizer clutches 22 and 26 are configuration clutches, the same as with the embodiment shown in FIG. 1. The synchronizer clutches 28, 230, and 234 are ratio control clutches similar to those shown in FIG. 1. The brake member 238 is operable to control the grounding of the synchronizer clutch 234 and the brake 236 is operable to control the grounding of planet carrier 64. In FIG. 1, the functions are reversed since brake 38 is operable to control the grounding of the carrier 64 and the brake 36 is operable to control the grounding of the synchronizer clutch 34.

Figure 4:
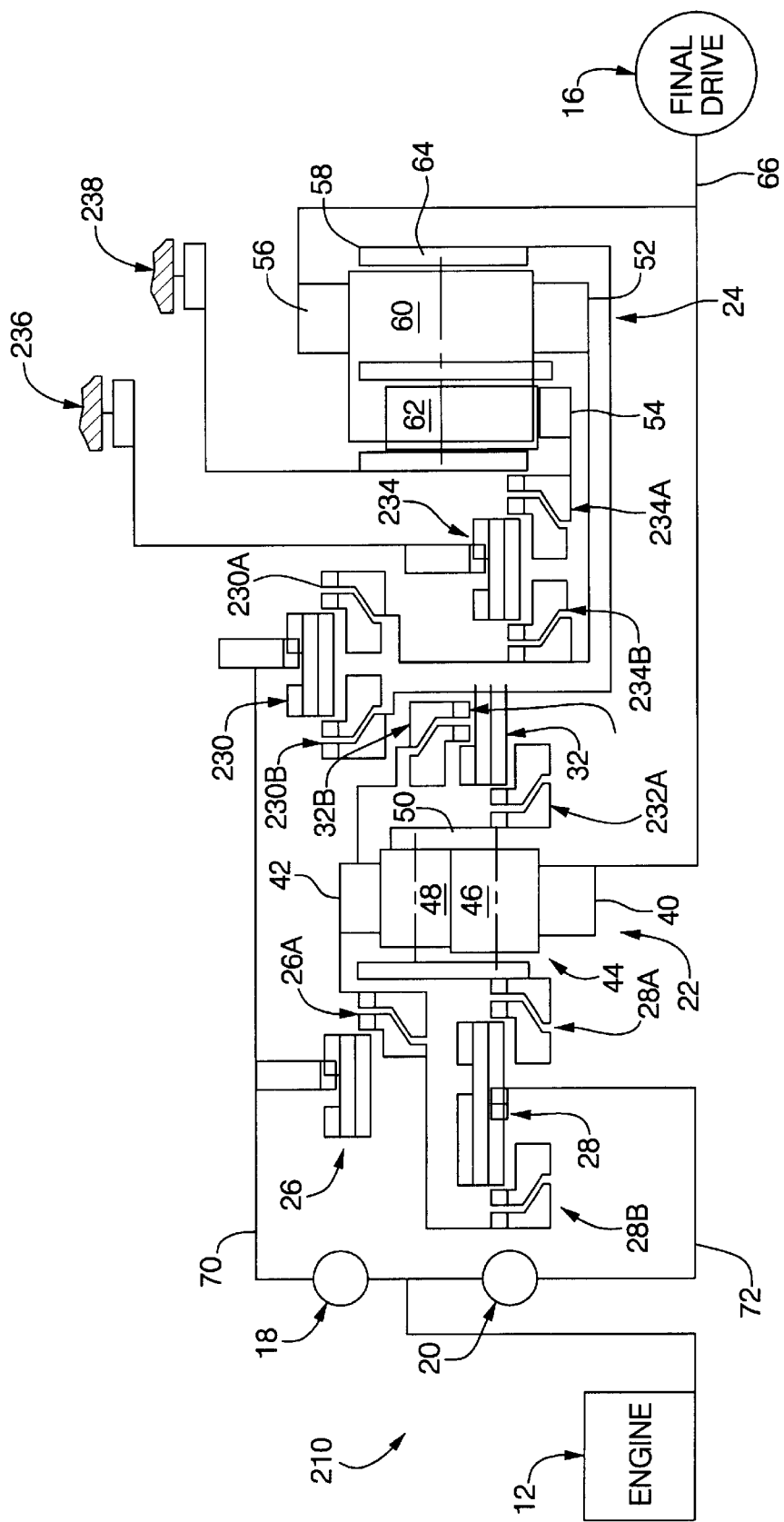
FIG. 4 is a schematic representation of a planetary transmission incorporating another embodiment of the present invention.

Those skilled in the art will recognize from the truth table that the same elements are grounded, the same elements are connected with the input from the engine 12, and the same elements are controlled by the configuration synchronizer clutches. The difference being the order of engagement in the synchronizer clutches 234, 230 and brakes 236, 238 are arranged differently or connected with different members in the FIG. 4 representation of the planetary transmission 214 compared with the configuration of the planetary transmission 14 shown FIG. 1. Another aspect of these embodiments of transmission 214 operates substantially identical with the embodiment of transmission 14.

Obviously, many modifications and variations are possible in light of the above disclosure. Therefore, it should be understood that the invention is only to be limited by the scope of the appended claims.

What is claimed is:

1. A powertrain including a power transmission comprising:

an engine;

a power input shaft continuously connected with said engine;

a power output shaft;

a first selectively engageable input clutch operatively connected with said input shaft;

a second selectively engageable input clutch operatively connected with said input shaft;

a first planetary gear means including a first member continuously connected with said power output shaft, a second member, and a third member;

a second planetary gear means including a first gear member continuously connected with said power output shaft, a second member, a third member, and a fourth member;

a first mechanical clutch selectively connectible between said first input clutch and said second member of said first planetary gear means;

a second mechanical clutch operable to individually selectively connect said second input clutch with said third member of said first planetary gear means and with said second member of said first planetary gear means;

a third mechanical clutch operable to connect said first input clutch and said first mechanical clutch selectively, individually with a fifth mechanical clutch and said second member of said second planetary gear means;

a fourth mechanical clutch selectively connecting a first brake mechanism individually with said third member of said second planetary gear means and with a member of a group consisting of said second member of said second planetary gear means and said fourth member of said second planetary gear means;

said fifth mechanical clutch selectively individually connecting said third member of said first planetary gear means with said fourth member of said second planetary gear means and said second member of said first planetary gear means with said fourth member of said second planetary gear means;

a second brake mechanism selectively connectible with said fourth member of said second planetary gear means when said fourth mechanical clutch is connectible with said second member of said second planetary gear means and selectively connectible with said second member of said second planetary gear means when said fourth mechanical clutch is connectible with said fourth member of said second planetary gear means; and said input clutches, said mechanical clutches, and said brake mechanisms being selectively engaged in a plurality of combinations to establish at least six forward speed ratios and one reverse speed ratio between said input shaft and said output shaft.

2. The powertrain defined in claim 1 further wherein:

said first member of said first planetary gear means is a sun gear member, said second member of said first planetary gear means is a ring gear member, and said third member of said first planetary gear means is a planet carrier assembly member.

3. The powertrain defined in claim 1 further wherein;

said first member of said second planetary gear means is a ring gear member, second member of said second planetary gear means is a first sun gear member, said third member of said second planetary gear means is a second sun gear member, and said fourth member of said second planetary gear means is a planet carrier assembly member.

4. The powertrain defined in claim 2 further wherein;

said first member of said second planetary gear means is a ring gear member, second member of said second planetary gear means is a first sun gear member, said third member of said second planetary gear means is a second sun gear member, and said fourth member of said second planetary gear means is a planet carrier assembly member.

* * * * *